United States Patent
Dasgupta et al.

(10) Patent No.: US 9,852,314 B1
(45) Date of Patent: *Dec. 26, 2017

(54) MOBILE DEVICE ACCESS CONTROL WITH TWO-LAYERED DISPLAY

(71) Applicant: INTERNATIONAL BUSINESS MACHINES CORPORATION, Armonk, NY (US)

(72) Inventors: Diptiman Dasgupta, Kolkata (IN); Arindam Maji, Kolkata (IN); Sarbajit K. Rakshit, Kolkata (IN); Sujay Sarkar, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,070

(22) Filed: Mar. 20, 2017

(51) Int. Cl.
*H04M 1/66* (2006.01)
*G06F 21/84* (2013.01)
(Continued)

(52) U.S. Cl.
CPC ............ *G06F 21/84* (2013.01); *G06F 3/0482* (2013.01); *G06F 3/0488* (2013.01); *G06F 21/31* (2013.01);
(Continued)

(58) Field of Classification Search
CPC .... B60K 2350/1024; B60K 2350/1028; B60K 35/00; H04W 4/02; H04W 4/021; H04W 4/027; H04W 4/028; H04W 4/04; H04W 4/22; H04W 88/02; H04W 88/06; H04W 12/06; H04W 8/205; H04W 4/001; H04W 4/00; H04W 24/02; H04W 48/14; H04W 92/08; G06F 1/1637; G06F 1/1639; G06F 1/1649; G06F 1/1652; G06F 1/1692; H04M 2207/18; H04M 2201/38; H04M 1/663;
(Continued)

(56) References Cited

U.S. PATENT DOCUMENTS 6,583,770 B1 6/2003 Antila et al.
2010/0120470 A1 5/2010 Kim et al.
(Continued)

OTHER PUBLICATIONS

Amadeo, Ron; Samsung shows off 55-inch transparent and mirror OLED displays; Retrieved from the Internet Apr. 28, 2016; URL: http://arstechnica.com/gadgets/2015/06/samsung-shows-55-inch-tran . . . ; Jun. 10, 2015; 3 pages.
(Continued)

*Primary Examiner* — Nimesh Patel
(74) *Attorney, Agent, or Firm* — Schmeiser, Olsen & Watts; John Pivnichny (57) ABSTRACT

An approach is provided for controlling access to contents displayed on a mobile device. Based on a security rule, the contents are divided into first and second sets. A first user is authorized to access the first set and not authorized to access the second set. The first set is displayed on a physical, transparent, touch functionality-enabled first layer of a display of the mobile device. The second set is displayed on a physical, opaque, touch functionality-lacking second layer of the display. A security level of a second user is determined after the first user stops using and the second user starts using the mobile device. Based on the security level, the contents are modified so that item(s) are removed from the first set and placed in the second set and/or other item(s) are removed from the second set and placed in the first set.

19 Claims, 4 Drawing Sheets

(51) Int. Cl.
   *G06F 21/31*   (2013.01)
   *G06F 3/0488*  (2013.01)
   *G06F 3/0482*  (2013.01)
   *H04W 88/02*   (2009.01)
   *G06F 3/0481*  (2013.01)

(52) U.S. Cl.
   CPC ......... *G06F 3/04817* (2013.01); *H04W 88/02* (2013.01)

(58) Field of Classification Search
   CPC ..... H04M 2203/2005; H04M 2207/12; H04M 2215/81
   See application file for complete search history.

(56) References Cited

U.S. PATENT DOCUMENTS

| | | |
|---|---|---|
| 2011/0210922 A1 | 9/2011 | Griffin |
| 2013/0055347 A1 | 2/2013 | Chawla et al. |
| 2013/0201132 A1 | 8/2013 | Kunioka et al. |
| 2014/0173721 A1 | 6/2014 | Shenfield et al. |

OTHER PUBLICATIONS

Barnum, Peter C.; et al.; A Multi-Layered Display with Water Drops; ACM Transactions on Graphics (SIGGRAPH); Jul. 2010; 6 pages.

Lai, Yen-Shou; et al. Screen-capturing System with Two-layer Display for PowerPoint Presentation to Enhance Classroom Education; Education Technology & Society 14(3); Jul. 2011; pp. 69-81.

Planar LookThru OLED Series; Retrieved from the Internet Apr. 28, 2016; URL: http://www.planar.com/products/transparent-displays/; 2 pages.

Prema, Vijay et al.; 3D Visualisation Techniques for Multi-Layer Display Technology; IVCNZ vol. 6; 2006; 6 pages.

Wetzatein, Gordon et al.; Layered 3D: Tomographic Image Synthesis for Attenuation-based Light Field and High Dynamic Range Displays; Proceedings of ACM SIGGRAPH 2011 ACM Transaction on Graphics (TOG); vol. 30, Issue, Article No. 95; Jul. 2011; 11 pages.

Wikipedia; See-through display; Retrieved from the Internet Apr. 28, 2016; URL https://en.wikipedia.org/wiki/See-through_display; 3 pages.

Notice of Allowance dated Dec. 13, 2016 for U.S. Appl. No. 15/283,820, filed Oct. 3, 2016; Confirmation No. 6576.

MOBILE DEVICE ACCESS CONTROL WITH TWO-LAYERED DISPLAY

This application is a continuation application claiming priority to Ser. No. 15/283,820 filed Oct. 3, 2016.

BACKGROUND

The present invention relates to access control, and more particularly to authenticating and controlling access to mobile device apps.

Security of digital content is a very important aspect in any mobile device. An unauthorized user should not be allowed to use critical application functionalities or mobile apps. Known security apps are available by which the user must provide multi-level passwords that include, a gesture pattern, one-time password (OTP), a keyword-based password, etc. These known security apps require additional time for the user to perform the gesture pattern or receive the OTP. Other known security techniques include auto hiding, disabling apps icons, application functionalities, etc.

Transparent displays have a see-through property and are being used in many devices. Because of the see-through property, while a user can see a digital object shown in a transparent display, the user can also see background content through the transparent display.

SUMMARY

In a first embodiment, the present invention provides a method of controlling access to contents displayed on a mobile device which includes a display having first and second layers. The method includes the mobile device identifying a user of the mobile device. The method further includes the mobile device determining a level of security defined for the identified user. The method further includes the mobile device dividing the contents into a first set of one or more contents that the user is authorized to access based on the level of security and a second set of one or more contents that the user is not authorized to access based on the level of security. The first and second sets are mutually exclusive. The contents include icons of apps loaded on the mobile device or specify functionalities of an application being executed on the mobile device. The method further includes the mobile device displaying the first set of one or more contents on the first layer of the display and not on the second layer of the display. The first layer is a physical, transparent display having touch functionality enabled, which allows the user to access the first set of one or more contents. The method further includes the mobile device displaying the second set of one or more contents on the second layer of the display and not on the first layer of the display. The second set of one or more contents is viewed by the user through the first layer of the display. The second layer is a physical, transparent or opaque display that does not have touch functionality, which prevents the user from accessing the second set of one or more contents.

In a second embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of controlling access to contents displayed on a mobile device included in the computer system which includes a display having first and second layers. The method includes the mobile device identifying a user of the mobile device. The method further includes the mobile device determining a level of security defined for the identified user. The method further includes the mobile device dividing the contents into a first set of one or more contents that the user is authorized to access based on the level of security and a second set of one or more contents that the user is not authorized to access based on the level of security. The first and second sets are mutually exclusive. The contents include icons of apps loaded on the mobile device or specify functionalities of an application being executed on the mobile device. The method further includes the mobile device displaying the first set of one or more contents on the first layer of the display and not on the second layer of the display. The first layer is a physical, transparent display having touch functionality enabled, which allows the user to access the first set of one or more contents. The method further includes the mobile device displaying the second set of one or more contents on the second layer of the display and not on the first layer of the display. The second set of one or more contents is viewed by the user through the first layer of the display. The second layer is a physical, transparent or opaque display that does not have touch functionality, which prevents the user from accessing the second set of one or more contents.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of controlling access to contents displayed on a mobile device included in the computer system which includes a display having first and second layers. The method includes the mobile device identifying a user of the mobile device. The method further includes the mobile device determining a level of security defined for the identified user. The method further includes the mobile device dividing the contents into a first set of one or more contents that the user is authorized to access based on the level of security and a second set of one or more contents that the user is not authorized to access based on the level of security. The first and second sets are mutually exclusive. The contents include icons of apps loaded on the mobile device or specify functionalities of an application being executed on the mobile device. The method further includes the mobile device displaying the first set of one or more contents on the first layer of the display and not on the second layer of the display. The first layer is a physical, transparent display having touch functionality enabled, which allows the user to access the first set of one or more contents. The method further includes the mobile device displaying the second set of one or more contents on the second layer of the display and not on the first layer of the display. The second set of one or more contents is viewed by the user through the first layer of the display. The second layer is a physical, transparent or opaque display that does not have touch functionality, which prevents the user from accessing the second set of one or more contents.

Embodiments of the present invention provide dynamic access control of digital objects on a mobile device using contextual analysis and a two-layer display, which avoids the time-consuming user actions in multi-level authentication systems.

DETAILED DESCRIPTION

Overview

Embodiments of the present invention employ a transparent display as at least one layer of a two-layer display of a mobile device to provide an access control of digital objects which are presented on the display. The two-layer display includes upper and lower layers. The upper layer is a transparent display. The lower layer is either a transparent display or an opaque display. Based on security level associated with a user, embodiments of the present invention determine a first set of objects that the user is authorized to access and a second set of objects that the user is not authorized to access. The first set of objects is displayed on the upper layer only and the second set of objects is displayed on the lower layer only. Touch functionality is enabled in the upper layer, but not in the lower layer, so that the user has access only to the first set of objects (i.e., app icons and application functionalities) that are displayed on the upper layer, but not to the second set of objects that are displayed on the lower layer. The user views the second set of objects by looking through the transparent upper layer to the lower layer.

Embodiments of the present invention employ contextual analysis of the usage of the mobile device to select an appropriate security rule, which is a basis for determining the objects that are placed in the first set which is displayed on the upper layer and determining other objects that are placed in the second set which is displayed on the lower layer.

System for Controlling Access to Contents Displayed on a Mobile Device

Figure 1:
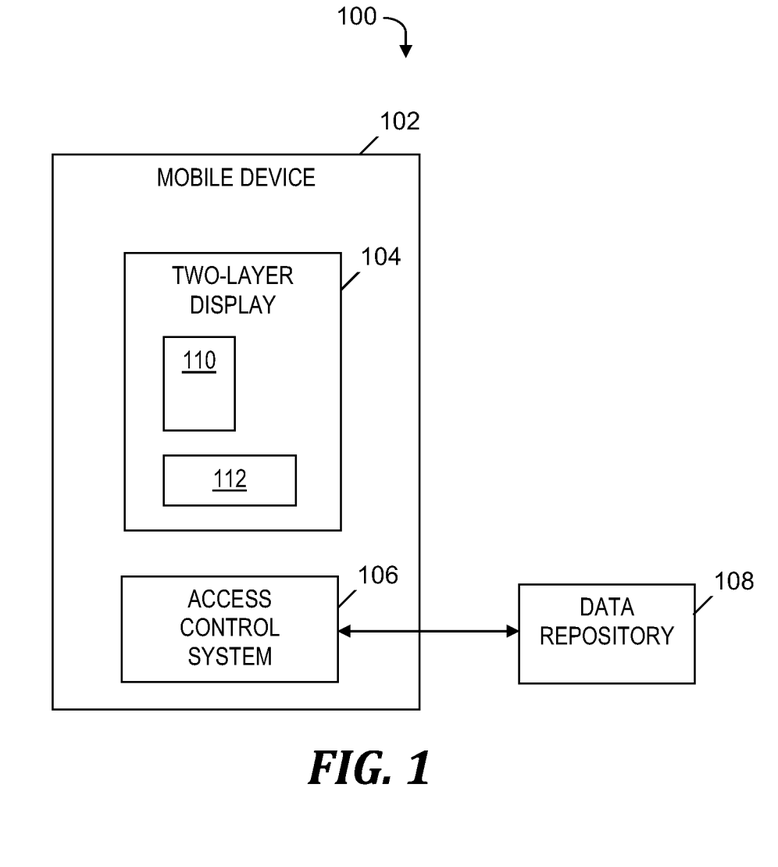
FIG. 1 is a block diagram of a system for controlling access to contents displayed on a mobile device which includes a display having first and second layers, in accordance with embodiments of the present invention.

FIG. 1 is a block diagram of a system 100 for controlling access to contents displayed on a mobile device which includes a display having first and second layers, in accordance with embodiments of the present invention. System 100 includes a mobile device 102, which includes a two-layer display 104 and runs a software-based access control system 106 which controls access to contents displayed on two-layer display 104.

Access control system 106 identifies a user who is utilizing mobile device 102 by utilizing one or more cameras (not shown) or one or more sensors (not shown) that recognize the user, or by analyzing a usage pattern of the user and finding the usage pattern in a collection of usage patterns associated with respective users, where the collection of usage patterns is stored in a data repository 108.

Access control system 106 retrieves a security rule from data repository 108, where the retrieved security rule is associated with the identified user. Alternatively, access control system 106 retrieves a user role from data repository 108, where the user role is associated with the identified user and further retrieves a security rule from data repository 108, where the retrieved security rule is associated with the user role.

Based on the security rule and a contextual analysis of the contents to be displayed, access control system 106 divides the contents to be displayed on two-layer display 104 into a first set of one or more contents 110 and a second set of one or more contents 112. Access control system 106 displays the first set of one or more contents 110 in a first (i.e., upper) layer (not shown) of two-layer display 104 and not in a second (i.e., lower) layer (not shown) of two-layer display 104. Access control system 106 displays the second set of one or more contents 112 in the second layer, but not the first layer of two-layer display 104. The second set of one or more contents 112 are viewed by a user who sees second set 112 through the transparent upper layer of two-layer display 104.

Figure 2:
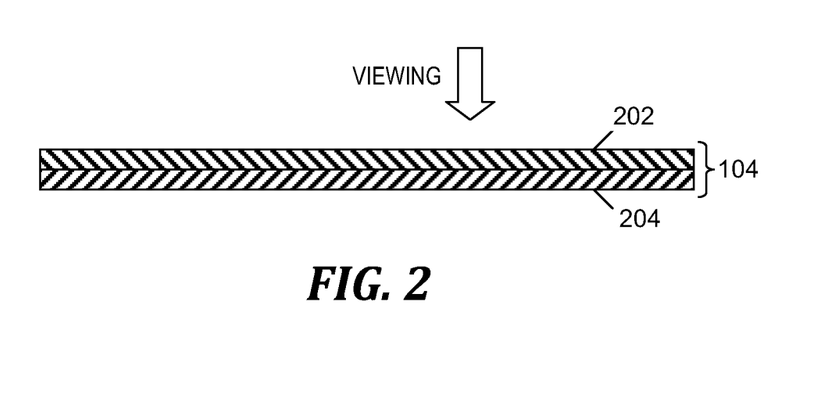
FIG. 2 is a side view of the two-layer display included in the system of FIG. 1, in accordance with embodiments of the present invention.
Figure 3:
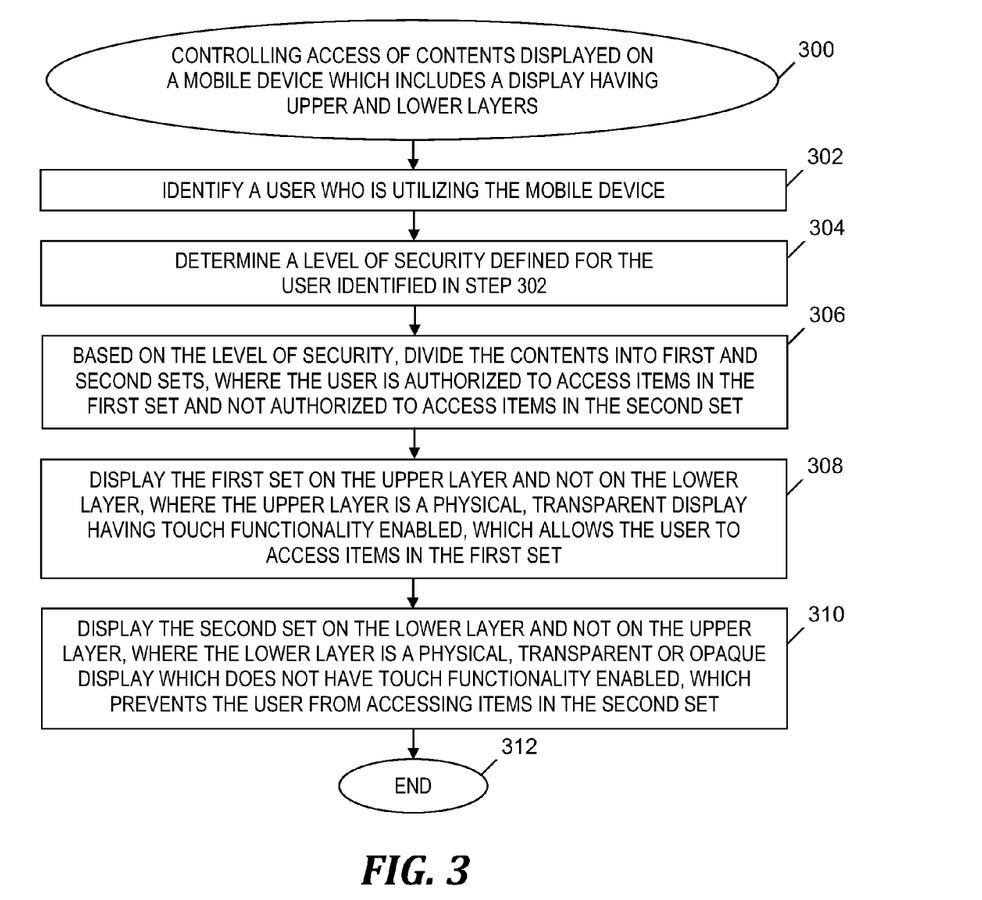
FIG. 3 is a flowchart of a process of controlling access to contents displayed on a mobile device which includes a display having first and second layers, where the process is implemented in the system of FIG. 1, in accordance with embodiments of the present invention.
Figure 4:
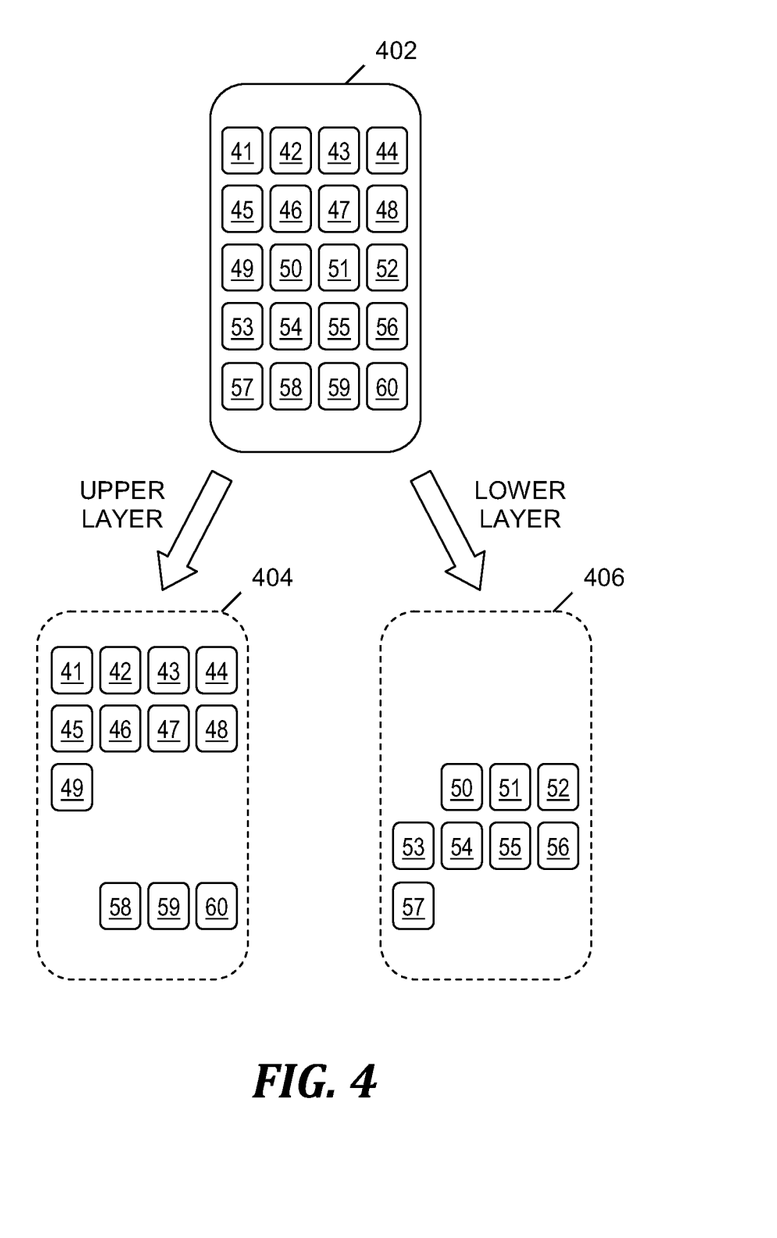
FIG. 4 is an example of displaying two sets of icons on respective layers in the process of FIG. 3, where the two sets are based on respective levels of security, in accordance with embodiments of the present invention.

The functionality of the components shown in FIG. 1 is described in more detail in the discussion of FIG. 2, FIG. 3, and FIG. 4 presented below. The layers included in two-layer display 104 are discussed below relative to FIG. 2.

FIG. 2 is a side view of the two-layer display 104 included in the system of FIG. 1, in accordance with embodiments of the present invention. Two-layer display includes a first (i.e., upper) layer 202 and a second (i.e., lower) layer 204. Upper layer 202 is on top of lower layer 204 from the perspective of a user who is utilizing mobile device 102 (see FIG. 1) and looking downward to view two-layer display 104. Upper layer 202 is a transparent display and has a touch sensor installed. Lower layer 204 may be a transparent display or an opaque display, but does not have a touch sensor installed. Again, the second set of one or more contents is viewed by the user who is looking through the transparent display of upper layer 202. Because the lower layer 204 does not have a touch sensor installed, the user cannot execute touch functionality associated with the second set of one or more contents. Because upper layer 202 has the touch sensor installed, the user can execute touch functionality associated with the first set of one or more contents.

Process for Controlling Access to Contents Displayed on a Mobile Device

FIG. 3 is a flowchart of a process of controlling access to contents displayed on a mobile device which includes a display having first and second layers, where the process is implemented in the system of FIG. 1, in accordance with embodiments of the present invention. The process of FIG. 3 begins at step 300. Prior to step 302, a touch sensor is installed in upper layer 202 (see FIG. 2) of two-layer display 104 (see FIG. 1 and FIG. 2), but not in lower layer 204 (see FIG. 2) of two-layer display 104 (see FIG. 1 and FIG. 2). Prior to step 302, a user of mobile device 102 (see FIG. 1) or other person defines security rules associated with respective users or user roles and stores the security rules in data repository 108 (see FIG. 1).

In step 302, access control system 106 (see FIG. 1) identifies a user who is utilizing mobile device 102 (see FIG. 1) by means of a fingerprint, facial recognition, usage pattern, or any other biometric or gesture and password.

In step 304, access control system 106 (see FIG. 1) determines a level of security defined for the user identified in step 302.

Prior to step 306, access control system 106 (see FIG. 1) determines contents to be displayed on two-layer display 104 (see FIG. 1 and FIG. 2). In step 306, based on the level of security determined in step 304, access control system 106 (see FIG. 1) divides the contents to be displayed into first and second sets, where the user is authorized to access items in the first set and is not authorized to access items in the second set. As used herein, contents are defined as graphical control elements such as icons of apps loaded on mobile device 102 (see FIG. 1) or objects that activate functionalities of an application being executed by mobile device 102 (see FIG. 1).

In step 308, access control system 106 (see FIG. 1) displays the first set of one or more contents 110 (see FIG. 1) on the upper layer 202 (see FIG. 2), but not on the lower layer 204 (see FIG. 2).

In step 310, access control system 106 (see FIG. 1) displays the second set of one or more contents 112 (see FIG. 1) on the lower layer 204 (see FIG. 2), but not on the upper layer 202 (see FIG. 2).

The user performs a touch action to activate a first item included in the first set of one more contents 110 (see FIG. 1), which results in the first item being activated via touch functionality because the first item is displayed on upper layer 202 (see FIG. 2), which has a touch sensor installed which provides the touch functionality. The user attempting to perform a touch action to activate a second item included in the second set of one or more contents 112 (see FIG. 1) results in the second item not being activated via touch functionality because the second item is displayed on lower layer 204 (see FIG. 2), which does not have a touch sensor installed and therefore does not provide the touch functionality required to activate the second item.

The process of FIG. 3 ends at step 312.

Example

FIG. 4 is an example of displaying two sets of icons on respective layers in the process of FIG. 3, where the two sets are based on respective levels of security, in accordance with embodiments of the present invention. A user of a mobile device views a display 402 of the mobile device and sees icons 41, 42, 43, 44, 45, 46, 47, 48, 49, 50, 51, 52, 53, 54, 55, 56, 57, 58, 59, and 60. Based on an identity of the user and a lower security level associated with a first set of icons 41, 42, 43, 44, 45, 46, 47, 48, 49, 58, 59, and 60, access control system 106 (see FIG. 1) displays the first set of icons on an upper layer 404 of display 402, where upper layer 404 has touch functionality and the first set of icons are touch enabled. Based on the identity of the user and a higher security level associated with a second set of icons 50, 51, 52, 53, 54, 55, 56, and 57, access control system 106 (see FIG. 1) displays the second set of icons on a lower layer 406 of display 402, where lower layer 406 does not have touch functionality and the second set of icons are not touch enabled.

Display 402 is an example of two-layer display 104 (see FIG. 1 and FIG. 2). Upper layer 404 is an example of layer 202 (see FIG. 2). Lower layer 406 is an example of layer 204 (see FIG. 2).

Computer System

Figure 5:
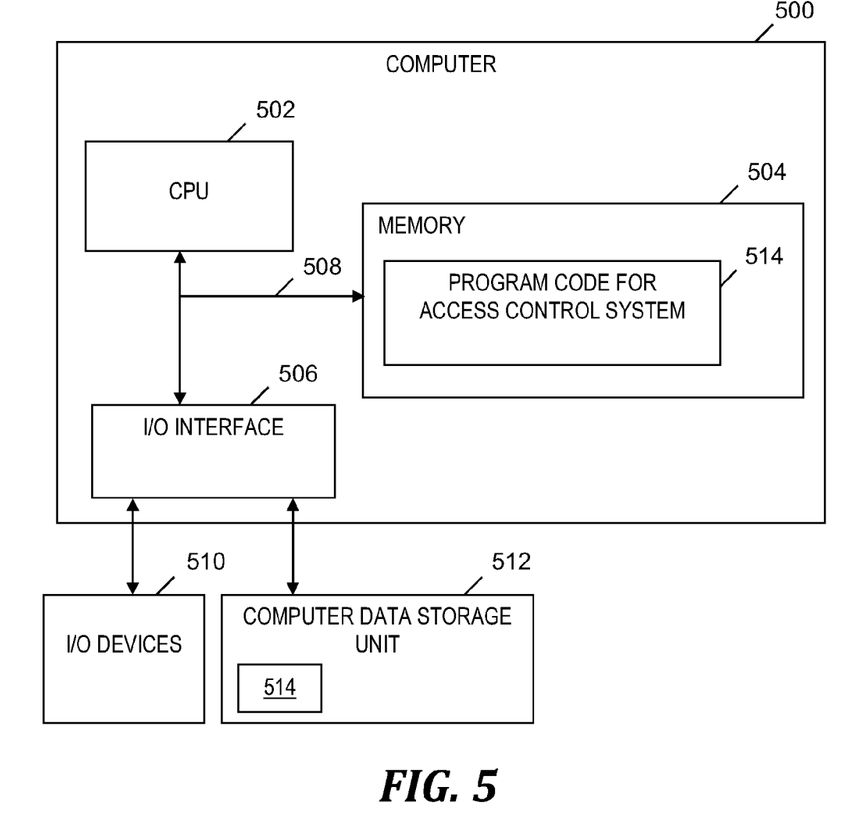
FIG. 5 is a block diagram of a computer that includes the mobile device included in the system of FIG. 1 and that implements the process of FIG. 3, in accordance with embodiments of the present invention.

FIG. 5 is a block diagram of a computer 500 that includes mobile device 102 which is included in the system of FIG. 1 and that implements the process of FIG. 3, in accordance with embodiments of the present invention. Computer 500 is a computer system that generally includes a central processing unit (CPU) 502, a memory 504, an input/output (I/O) interface 506, and a bus 508. Further, computer 500 is coupled to I/O devices 510 and a computer data storage unit 512. In one embodiment, computer 500 includes mobile device 102 (see FIG. 1). CPU 502 performs computation and control functions of computer 500, including executing instructions included in program code 514 for access control system 106 (see FIG. 1) to perform a method of controlling access to contents displayed on a mobile device which includes a display having first and second layers, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including two-layer display 104 (see FIG. 1), keyboard, etc. Bus 508 provides a communication link between each of the components in computer 500, and may include any type of transmission link, including electrical, optical, wireless, etc.

I/O interface 506 also allows computer 500 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to control access to contents displayed on a mobile device which includes a display having first and second layers. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 500 may store any combination of: user roles and security rules accessed by access control system 106 to divide contents displayed on mobile device 102 (see FIG. 1) into a first set of one or more contents 110 (see FIG. 1) and a second set of one or more contents 112 (see FIG. 1), where a user is authorized to access the first set and is not authorized to access the second set.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling access to contents displayed on a mobile device which includes a display having first and second layers. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 500) including one or more processors (e.g., CPU 502), wherein the processor(s) carry out instructions contained in the code causing the computer system to control access to contents displayed on a mobile device which includes a display having first and second layers. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling access to contents displayed on a mobile device which includes a display having first and second layers.

While it is understood that program code 514 for controlling access to contents displayed on a mobile device which includes a display having first and second layers may be deployed by manually loading directly in client, server and proxy computers (not shown) via loading a computer-readable storage medium (e.g., computer data storage unit 512), program code 514 may also be automatically or semi-automatically deployed into computer 500 by sending program code 514 to a central server or a group of central servers. Program code 514 is then downloaded into client computers (e.g., computer 500) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of controlling access to contents displayed on a mobile device which includes a display having first and second layers. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 500). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 500) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 3) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 500) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 500), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of controlling access to contents displayed on a mobile device which includes a display having first and second layers, the method comprising the steps of:
   the mobile device identifying a first user of the mobile device;
   the mobile device determining a first level of security defined for the first user;
   the mobile device receiving a security rule that specifies a combination of: an object in a graphical user interface presented in the display, text presented in the display, and a physical state of the mobile device as determined by a camera or a sensor coupled to the mobile device;
   based on the security rule, the mobile device dividing the contents into a first set of one or more contents that the first user is authorized to access based on the first level of security and a second set of one or more contents that the first user is not authorized to access based on the first level of security, the first and second sets being mutually exclusive, and the contents including icons of apps loaded on the mobile device or specifying functionalities of an application being executed on the mobile device;
   the mobile device displaying the first set of one or more contents on the first layer of the display and not on the second layer of the display, the first layer being a physical, transparent display having touch functionality enabled, which allows the first user to access the first set of one or more contents;
   the mobile device displaying the second set of one or more contents on the second layer of the display and not on the first layer of the display, the second set of one or more contents being viewed by the first user through the first layer of the display, and the second layer being a physical, opaque display that does not have touch functionality, which prevents the first user from accessing the second set of one or more contents;
   the mobile device determining that the first user stopped using the mobile device and that a second user starts using the mobile device;
   the mobile device identifying the second user of the mobile device;
   the mobile device determining a second level of security defined for the second user; and
   based on the second level of security, the mobile device modifying the divided contents so that (1) at least one item included in the first set of one or more contents is removed from the first set and placed in the second set of one or more contents, (2) at least one item included in the second set of one or more elements is removed from the second set and placed in the first set of one or more contents, or (3) at least one item included in the first set is removed from the first set and placed in the second set and at least one item included in the second set is removed from the second set and placed in the first set.

2. The method of claim 1, further comprising the steps of:
   the mobile device receiving a first touch-based selection by the first user of a first content element included in the first set and displayed in the first layer, and in response to the step of receiving the first selection, the mobile device executing a functionality associated with the first content element; and in response to the first user attempting to perform a touch-based selection of a second content element included in the second set and displayed on the second layer, the mobile device prohibiting an execution of a functionality associated with the second content element, which prevents an unauthorized access of the second content element.

3. The method of claim 1, further comprising the step of the mobile device performing a contextual analysis of a usage of the mobile device by the first user, wherein the step of dividing the contents is based on the contextual analysis.

4. The method of claim 1, further comprising the steps of:
the mobile device determining a change in the physical state of the mobile device; and based on the change in the physical state of the mobile device and the security rule that specifies the physical state, the mobile device modifying the first set of one or more contents to remove an item from the first set of one or more contents, so that the item is displayed on the second layer and no longer displayed on the first layer, which results in the first user no longer having access to the item.

5. The method of claim 1, further comprising the steps of:
while a current time is not within a first time period, the mobile device displaying a first item on the second layer so that the first user does not have access to the first item, wherein the step of receiving the security rule includes receiving the security rule that further specifies the first time period during which the first user is permitted to access the first item, which is included in the contents;

subsequent to the step of displaying the first item on the second layer, the mobile device determining an updated current time and determining that the updated current time is included in the first time period; and based on the security rule that specifies the first time period and in response to the step of determining that the updated current time is included in the first time period, the mobile device removing the first item from the second set of one or more contents and adding the first item to the first set of one or more contents, so that the first item is displayed on the first layer and is no longer displayed on the second layer, which results in the first user having access to the first item.

6. The method of claim 1, further comprising the steps of:
while a current time is not within the second time period, the mobile device displaying a second item on the first layer so that the first user has access to the second item, wherein the step of receiving the security rule includes receiving the security rule that further specifies the second time period during which the first user is not permitted to access the second item, which is included in the contents;

subsequent to the step of displaying the second item on the first layer, the mobile device determining an updated current time and determining that the updated current time is included in the second time period; and based on the security rule that specifies the second time period and in response to the step of determining that the updated current time is included in the second time period, the mobile device removing the second item from the first set of one or more contents and adding the second item to the second set of one or more contents, so that the second item is displayed on the second layer and is no longer displayed on the first layer, which results in the first user not having access to the second item.

7. The method of claim 1, further comprising the step of: providing at least one support service for at least one of creating, integrating, hosting, maintaining, and deploying computer-readable program code in the computer, the program code being executed by a processor of the computer to implement the steps of identifying the first user, determining the first level of security, receiving the security rule, dividing the contents, displaying the first set, displaying the second set, determining that the first user stopped using the mobile device and that the second user starts using the mobile device, identifying the second user, determining the second level of security, and modifying the divided contents.

8. A computer program product, comprising:
a computer-readable storage medium; and
a computer-readable program code stored in the computer-readable storage medium, the computer-readable program code containing instructions that are executed by a central processing unit (CPU) of a computer system to implement a method of controlling access to contents displayed on a mobile device included in the computer system which includes a display having first and second layers, the method comprising the steps of:
the mobile device identifying a first user of the mobile device;

the mobile device determining a first level of security defined for the first user;

the mobile device receiving a security rule that specifies a combination of: an object in a graphical user interface presented in the display, text presented in the display, and a physical state of the mobile device as determined by a camera or a sensor coupled to the mobile device;

based on the security rule, the mobile device dividing the contents into a first set of one or more contents that the first user is authorized to access based on the first level of security and a second set of one or more contents that the first user is not authorized to access based on the first level of security, the first and second sets being mutually exclusive, and the contents including icons of apps loaded on the mobile device or specifying functionalities of an application being executed on the mobile device;

the mobile device displaying the first set of one or more contents on the first layer of the display and not on the second layer of the display, the first layer being a physical, transparent display having touch functionality enabled, which allows the first user to access the first set of one or more contents;

the mobile device displaying the second set of one or more contents on the second layer of the display and not on the first layer of the display, the second set of one or more contents being viewed by the first user through the first layer of the display, and the second layer being a physical, opaque display that does not have touch functionality, which prevents the first user from accessing the second set of one or more contents;

the mobile device determining that the first user stopped using the mobile device and that a second user starts using the mobile device;

the mobile device identifying the second user of the mobile device;

the mobile device determining a second level of security defined for the second user; and based on the second level of security, the mobile device modifying the divided contents so that (1) at least one item included in the first set of one or more contents is removed from the first set and placed in the second set of one or more contents, (2) at least one item included in the second set of one or more elements is removed from the second set and placed in the first set of one or more contents, or (3) at least one item included in the first set is removed from the first set and placed in the second set and at least one item included in the second set is removed from the second set and placed in the first set.

9. The computer program product of claim 8, wherein the method further comprising the steps of:

the mobile device receiving a first touch-based selection by the first user of a first content element included in the first set and displayed in the first layer, and in response to the step of receiving the first selection, the mobile device executing a functionality associated with the first content element; and in response to the first user attempting to perform a touch-based selection of a second content element included in the second set and displayed on the second layer, the mobile device prohibiting an execution of a functionality associated with the second content element, which prevents an unauthorized access of the second content element.

10. The computer program product of claim 8, wherein the method further comprises the step of the mobile device performing a contextual analysis of a usage of the mobile device by the first user, wherein the step of dividing the contents is based on the contextual analysis.

11. The computer program product of claim 8, wherein the method further comprises the steps of:

the mobile device determining a change in the physical state of the mobile device; and based on the change in the physical state of the mobile device and the security rule that specifies the physical state, the mobile device modifying the first set of one or more contents to remove an item from the first set of one or more contents, so that the item is displayed on the second layer and no longer displayed on the first layer, which results in the first user no longer having access to the item.

12. The computer program product of claim 8, wherein the method further comprises the steps of:

while a current time is not within a first time period, the mobile device displaying a first item on the second layer so that the first user does not have access to the first item, wherein the step of receiving the security rule includes receiving the security rule that further specifies the first time period during which the first user is permitted to access the first item, which is included in the contents;

subsequent to the step of displaying the first item on the second layer, the mobile device determining an updated current time and determining that the updated current time is included in the first time period; and based on the security rule that specifies the first time period and in response to the step of determining that the updated current time is included in the first time period, the mobile device removing the first item from the second set of one or more contents and adding the first item to the first set of one or more contents, so that the first item is displayed on the first layer and is no longer displayed on the second layer, which results in the first user having access to the first item.

13. The computer program product of claim 8, wherein the method further comprises the steps of:

while a current time is not within the second time period, the mobile device displaying a second item on the first layer so that the first user has access to the second item, wherein the step of receiving the security rule includes receiving the security rule that further specifies the second time period during which the first user is not permitted to access the second item, which is included in the contents;

subsequent to the step of displaying the second item on the first layer, the mobile device determining an updated current time and determining that the updated current time is included in the second time period; and based on the security rule that specifies the second time period and in response to the step of determining that the updated current time is included in the second time period, the mobile device removing the second item from the first set of one or more contents and adding the second item to the second set of one or more contents, so that the second item is displayed on the second layer and is no longer displayed on the first layer, which results in the first user not having access to the second item.

14. A computer system comprising:

a central processing unit (CPU);

a memory coupled to the CPU; and a computer readable storage device coupled to the CPU, the storage device containing instructions that are executed by the CPU via the memory to implement a method of controlling access to contents displayed on a mobile device included in the computer system which includes a display having first and second layers, the method comprising the steps of:

the mobile device identifying a first user of the mobile device;

the mobile device determining a first level of security defined for the first user;

the mobile device receiving a security rule that specifies a combination of: an object in a graphical user interface presented in the display, text presented in the display, and a physical state of the mobile device as determined by a camera or a sensor coupled to the mobile device;

based on the security rule, the mobile device dividing the contents into a first set of one or more contents that the first user is authorized to access based on the first level of security and a second set of one or more contents that the first user is not authorized to access based on the first level of security, the first and second sets being mutually exclusive, and the contents including icons of apps loaded on the mobile device or specifying functionalities of an application being executed on the mobile device;

the mobile device displaying the first set of one or more contents on the first layer of the display and not on the second layer of the display, the first layer being a physical, transparent display having touch functionality enabled, which allows the first user to access the first set of one or more contents;

the mobile device displaying the second set of one or more contents on the second layer of the display and not on the first layer of the display, the second set of one or more contents being viewed by the first user through the first layer of the display, and the second layer being a physical, opaque display that does not have touch functionality, which prevents the first user from accessing the second set of one or more contents;

the mobile device determining that the first user stopped using the mobile device and that a second user starts using the mobile device;

the mobile device identifying the second user of the mobile device;

the mobile device determining a second level of security defined for the second user; and based on the second level of security, the mobile device modifying the divided contents so that (1) at least one item included in the first set of one or more contents is removed from the first set and placed in the second set of one or more contents, (2) at least one item included in the second set of one or more elements is removed from the second set and placed in the first set of one or more contents, or (3) at least one item included in the first set is removed from the first set and placed in the second set and at least one item included in the second set is removed from the second set and placed in the first set.

15. The computer system of claim 14, wherein the method further comprising the steps of:

the mobile device receiving a first touch-based selection by the first user of a first content element included in the first set and displayed in the first layer, and in response to the step of receiving the first selection, the mobile device executing a functionality associated with the first content element; and in response to the first user attempting to perform a touch-based selection of a second content element included in the second set and displayed on the second layer, the mobile device prohibiting an execution of a functionality associated with the second content element, which prevents an unauthorized access of the second content element.

16. The computer system of claim 14, wherein the method further comprises the step of the mobile device performing a contextual analysis of a usage of the mobile device by the first user, wherein the step of dividing the contents is based on the contextual analysis.

17. The computer system of claim 14, wherein the method further comprises the steps of:

the mobile device determining a change in the physical state of the mobile device; and based on the change in the physical state of the mobile device and the security rule that specifies the physical state, the mobile device modifying the first set of one or more contents to remove an item from the first set of one or more contents, so that the item is displayed on the second layer and no longer displayed on the first layer, which results in the first user no longer having access to the item.

18. The computer system of claim 14, wherein the method further comprises the steps of:

while a current time is not within a first time period, the mobile device displaying a first item on the second layer so that the first user does not have access to the first item, wherein the step of receiving the security rule includes receiving the security rule that further specifies the first time period during which the first user is permitted to access the first item, which is included in the contents;

subsequent to the step of displaying the first item on the second layer, the mobile device determining an updated current time and determining that the updated current time is included in the first time period; and based on the security rule that specifies the first time period and in response to the step of determining that the updated current time is included in the first time period, the mobile device removing the first item from the second set of one or more contents and adding the first item to the first set of one or more contents, so that the first item is displayed on the first layer and is no longer displayed on the second layer, which results in the first user having access to the first item.

19. The computer system of claim 14, wherein the method further comprises the steps of:

while a current time is not within the second time period, the mobile device displaying a second item on the first layer so that the first user has access to the second item, wherein the step of receiving the security rule includes receiving the security rule that further specifies the second time period during which the first user is not permitted to access the second item, which is included in the contents;

subsequent to the step of displaying the second item on the first layer, the mobile device determining an updated current time and determining that the updated current time is included in the second time period; and based on the security rule that specifies the second time period and in response to the step of determining that the updated current time is included in the second time period, the mobile device removing the second item from the first set of one or more contents and adding the second item to the second set of one or more contents, so that the second item is displayed on the second layer and is no longer displayed on the first layer, which results in the first user not having access to the second item.

* * * * *